United States Patent
Khaleghi et al.

(10) Patent No.: US 6,975,609 B1
(45) Date of Patent: Dec. 13, 2005

(54) DYNAMIC CALL ADMISSION

(75) Inventors: Farideh Khaleghi, San Diego, CA (US); Vieri Vanghi, La Jolla, CA (US)

(73) Assignee: Telefonaktiebolaget LM Ericsson (publ) (SE)

(*) Notice: Subject to any disclaimer, the term of this patent is extended or adjusted under 35 U.S.C. 154(b) by 1010 days.

(21) Appl. No.: 09/583,998

(22) Filed: May 30, 2000

(51) Int. Cl.[7] .............................................. H04B 7/216
(52) U.S. Cl. ...................... 370/335; 370/342; 455/522
(58) Field of Search .................................. 370/335, 342, 370/310, 329, 468, 336, 465, 225, 229, 230, 249, 231, 232, 233, 325; 455/522, 453, 452.1, 452.2

(56) References Cited

U.S. PATENT DOCUMENTS

| | | | |
|---|---|---|---|
| 5,367,533 A | * 11/1994 | Schilling | .................... 370/342 |
| 5,991,618 A | 11/1999 | Hall | |
| 6,028,851 A | 2/2000 | Persson et al. | |
| 6,643,521 B1 | * 11/2003 | Bourgoin et al. | ........... 455/522 |

OTHER PUBLICATIONS

Ching Yao Huang et al.: "Call admission in power controlled CDMA systems" Apr. 28, 1996, pp. 1665–1669, XP002156007, ISBN: 0–783–3158–3.

Ishii K et al.: A New Dynamic Channel Allocation Algorithm Effectively Integrated with Transmitting Power Control, Mar. 1, 1996, pp. 272–278, XP00588450 ISSN: 0916–8516.

* cited by examiner

*Primary Examiner*—Chi Pham
*Assistant Examiner*—Alexander O. Boakye
(74) *Attorney, Agent, or Firm*—Coats & Bennett, P.L.L.C.

(57) ABSTRACT

A call admission policy is provided that has a dynamic operating point setting desired load levels for data calls and for voice calls. A request for a first call admission may be granted even though the desired load levels are exceeded if there is sufficient power to admit at least one additional second call, wherein the first call is selected form the group of data or voice calls and the second call is the remaining type of call within the group.

22 Claims, 3 Drawing Sheets

OPERATING REGION (SHADED AREA) IN WHICH VOICE CALL ADMISSION IS GRANTED

DYNAMIC CALL ADMISSION

FIELD OF THE INVENTION

This invention pertains generally to the field of wireless communications and more particularly to systems and methods for dynamic call admission.

BACKGROUND

The third generation (or "3G") of wireless communication services promises to bring unity to a fractured worldwide cellular market. 3G systems will permit seamless travel not presently available in the splintered U.S. mobile telephone service. In addition, 3G systems promise a wide array of high-speed broadband data transmission and processing, including video, on-board navigation, and Internet access.

One wireless standard designed to support 3G services is cdma2000™, defined by the ITU in its IMT-2000 vision. Phase one of the cdma2000 standard effort, known as "1×RTT" (i.e., Radio Transmission Technology), has already been completed and published by the Telecommunications Industry Association (TIA). 1×RTT refers to cdma2000 implementation within existing spectrum allocations for cdmaOne—1.25 MHz carriers. The technical term is derived from N=1 (i.e., use of the same 1.25 MHz carrier as in cdmaOne) and the "1×" means one times 1.25 MHz. 1×RTT is backward compatible with cdmaONE networks, but offers twice the voice capacity, data rates of up to 144 kbps, and overall quality improvements.

Phase 2 of the cdma 2000 standard (cdma2000-3X) offers even higher capacity than 1X, data rates of up to 2 Mbps, backward compatibility with both 1X and cdmaOne deployments, and other performance enhancements. 3X can also be implemented in existing or new spectrum allocations, but it utilizes a broader band of spectrum. The term 3X refers to N=3 (i.e. use of three 1.25 MHz carriers). There are currently two implementations of 3X identified in the standard. The Multi-Carrier mode utilizes three 1.25 MHz carriers to deliver 3G services, while the Direct Sequence mode utilizes one 3.75 MHz carrier to deliver the same services. The mode implemented would largely depend on the operator's existing spectrum allocations and usage.

Both 1X and 3X networks provide data services such as remote access of e-mail, mobile Internet browsing, and company information. Both voice and data calls must share the available network resources such as Walsh codes. The capacity of a CDMA network to admit a given voice or data caller is determined very differently than in a TDMA network. In a TDMA network, either a time slot is available for a caller, whether data or voice, or it is not. Thus, a call admission policy in a TDMA system need merely determine how many time slots a caller needs and whether these time slots are available. In contrast to this "binary" capacity, a CDMA network has a much "softer" network capacity—the callers do not occupy discrete time slots but rather share the entire available spectrum with each other simultaneously. Thus, theoretically, so long as a Walsh code is available for use, there are no hard limits on how many calls may occupy the available bandwidth. However, because the Walsh codes have finite levels of cross correlation, as more and more users occupy the bandwidth, unacceptable bit error rates eventually result. Other factors also limit the number of users in a CDMA system. Prior art CDMA systems typically divided the total available network resources at a fixed ratio between data and voice callers. This results in certain unavoidable inefficiencies. For example, a data call is typically very bursty, resulting in unpredictable sudden demands on network resources. Apportioning these network resources at a fixed ratio means that, from time to time, the network resources allocated to data callers are unused. These unused network resources could be allocated to voice callers, but must remain unused in such prior art systems, resulting in waste of network resources.

Thus, there is a need in the art for improved call admission policies that dynamically apportion network resources between data and voice users.

SUMMARY OF THE INVENTION

The invention provides in one aspect a method of call admission. Current loads for data and voice calls are estimated. A request for a voice call admission is granted if the total load after voice call admission is less than a maximum permitted power load unless the voice call load after voice call admission exceeds a desired voice call load and insufficient power is available for admitting at least one data call.

A function for estimating a reserved power for accommodating future bursts from existing data calls is also provided. The function is used to predict the total necessary reserved power if a data call request is granted. The request for the data call admission is granted if the load formed by the current load for voice calls and necessary reserved power is less than the maximum permitted power load unless the necessary reserved power after admission exceeds a desired data load level and insufficient power is available to admit at least one additional voice call.

Other aspects and advantages of the present invention are disclosed by the following description and figures.

DESCRIPTION OF FIGURES

The various aspects and features of the present invention may be better understood by examining the following figures.

DETAILED DESCRIPTION

Figure 1:
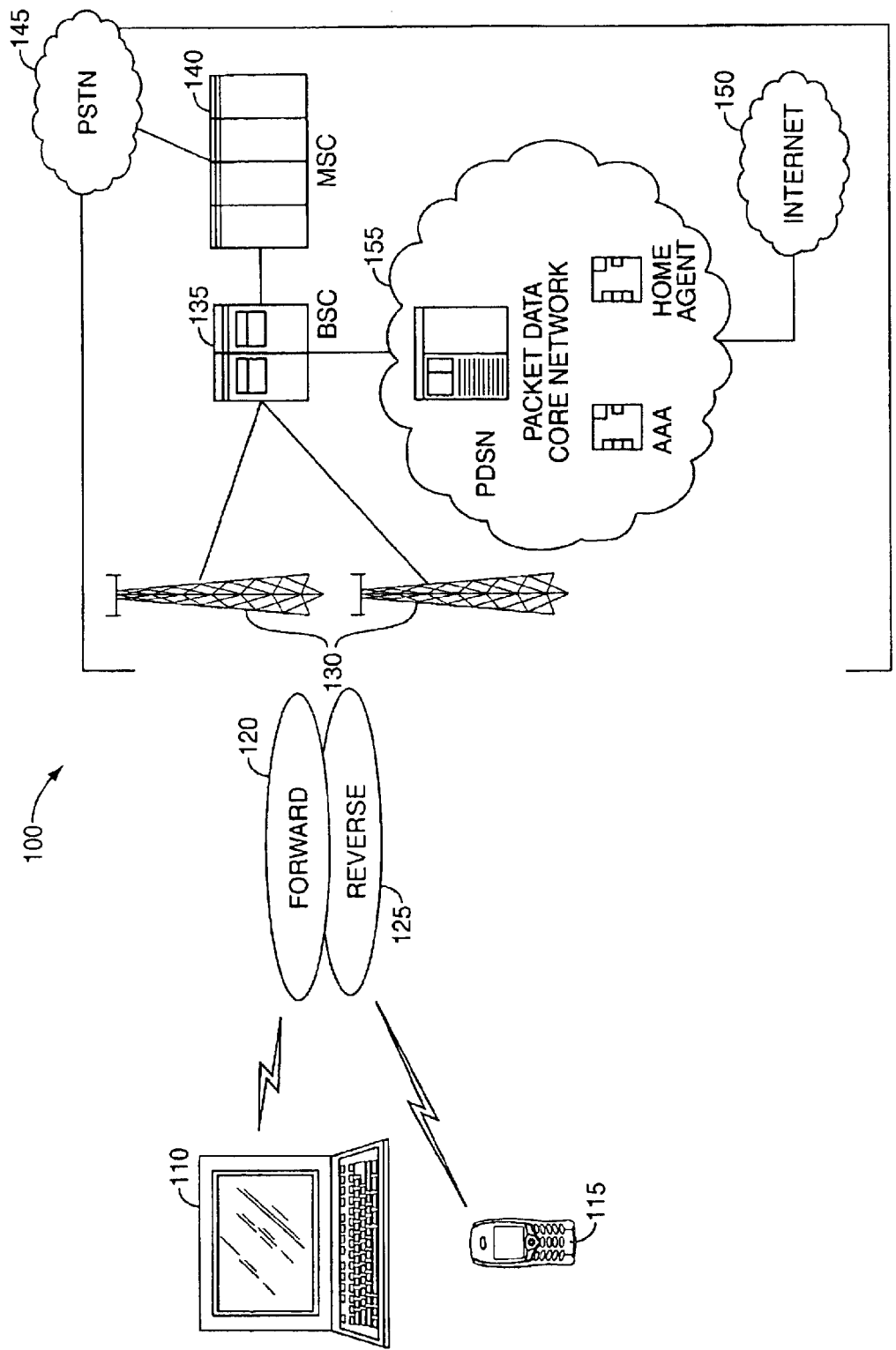
FIG. 1 illustrates typical network architecture for a cdma 2000 wireless system.

Turning now to the figures, a typical network architecture 100 for a cdma 2000 wireless system is illustrated in FIG. 1. Users at a mobile station such as a laptop computer 110 having a wireless transceiver or a handset 115 may transmit over a reverse radio channel 125 to radio base stations (RBS) 130. Similarly, the radio base stations 130 transmit over a forward radio channel 120 to the users 110 and 115. The forward and reverse radio channels 120 and 125 may carry voice, packet data, or other multi-services. The radio base stations 130 are under the control of a base station controller 135. A mobile switching center 140 connects a public switched telephone network (PSTN) 145 to the base station controller 135 so that voice calls may be placed between users 110 and 115 and users within the PSTN 145. In contrast to voice calls, data flowing to and from the Internet 150 such as packet data may directly enter the base station controller 135 via a packet data core network 155.

The forward and reverse radio channels 120 and 125 each comprise a number of different physical channels that may be divided into two classifications: dedicated and common channels. A dedicated physical channel provides a point to point connection, whereas a common channel provides a point to a multiplicity of points connection. Two important dedicated physical channels are the Fundamental Channel (FCH) and the Supplemental Channel (SCH). The FCH transports dedicated data at data rates of 9.6 Kbps and 14.4 Kbps. In contrast, the SCH is allocated dynamically to meet required higher data rates for packet data services.

Figure 2:
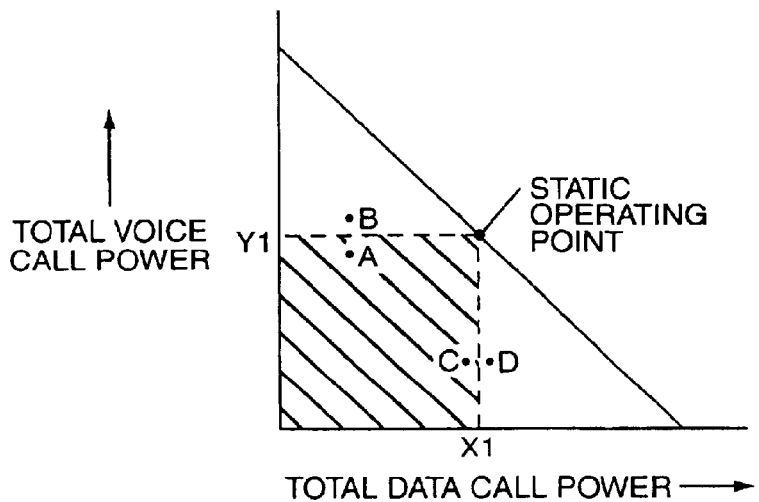
FIG. 2 illustrates the relationship between the voice call power and the data call power for a prior art call admission policy with a static operating point.

Unlike a TDMA channel such as in a GSM system, the forward and reverse radio channels 120 and 125 do not have a "hard" binary limit as to the amount of traffic that may be carried within each channel. Nevertheless, a call admission policy must be employed to limit the amount of traffic within each channel. In prior art call admission methods, a static operating point or limit on voice and data traffic was established. This static operating point established a maximum level or threshold for the amount of power (denoted as load) for both traffic and data calls. Note that the power for a given voice call will vary in a CDMA system depending upon a user's distance from the base station and the effects of other users within a cell. Thus, an estimate of the voice load or power for a given voice call must be performed periodically during the call's duration to account for this changing power level. Similarly, the load for a data call is even more unpredictable because of the bursty nature of data calls, ranging from a dormant or no load state to a substantial load during a burst period if a high data rate is used. Regardless of how the CDMA system estimates the voice and data loads, a given data or voice call request would not be granted if the resulting total load for either the data or voice calls exceeded the thresholds established by the static operating point. The relationship between the data and voice call loads and the static operating point is illustrated in FIG. 2. The static operating point establishes a threshold X1 for the total data call power or load and a threshold Y1 for the total voice call power or load. Suppose the current voice and data loads are as represented by point A, and a request for an additional voice call is made. Suppose further that if this additional voice call is admitted, the total voice call power is increased such that the threshold Y1 is crossed, resulting in an operating point B. Note that the current total data call power level at point B is relatively low so that the existing data calls would not be adversely affected by the admission of this additional voice call. Even if these existing data calls begin "bursting" large amounts of data, there is a substantial "cushion" of reserve power available to handle these bursts. Nevertheless, because the threshold Y1 is static, this additional voice call cannot be admitted.

Similarly, suppose that the current voice and data loads are as represented by point C and a request for an additional data call is made. Suppose further that if this additional data call is admitted, the total data call power is increased such that the threshold X1 is crossed, resulting in an operating point D. Note that the current total voice call power level at point B is relatively low so that there is a substantial reserve of power available to admit additional voice calls. Nevertheless, because the threshold Y1 is static, the operating point D is forbidden, resulting in the data call admission request being denied. The net effect of the static operating point is that the data and voice call loads are restricted to the cross-hatched area of FIG. 2.

Figure 3:
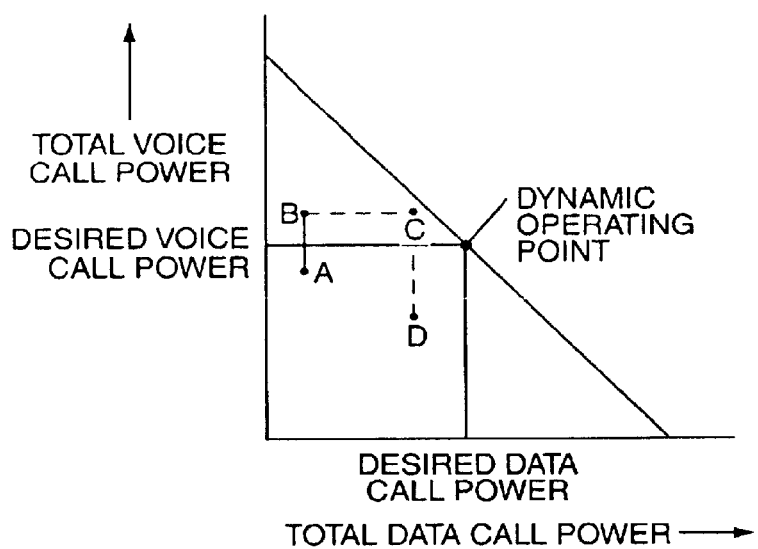
FIG. 3 illustrates the relationship between the voice call power and the data call power for a voice call admission policy with a dynamic operating point according to one embodiment of the invention.

In contrast, the present invention provides a dynamic call admission policy that avoids the inefficiencies introduced by a static operating point by instead having a dynamic operating point. This dynamic operating point corresponds to desired levels of voice call and data call power. FIG. 3 illustrates the relationship between the voice call power and the data call power for a voice call admission policy with a dynamic operating point. The dynamic operating point is settable by a user and establishes a desired voice call power and a desired data call power. Corresponding also to this dynamic operating point is a desired total power level equal to the sum of the desired voice call power and the desired data call power. Suppose that an estimate of the current voice and data loads is made, represented by point A. A request for a voice call admission is received that results in voice and data loads after call admission as represented by point B. The voice call load or power for point B exceeds the desired voice power level established by the dynamic operating point. If, however, a sufficient reserve of power is available to admit at least one data call, the additional voice call is admitted. Suppose further that after admitting the voice call at point B, the data call load increases, increasing the total call load to point C. At such a point, there may be insufficient reserve to admit at least one data call if an additional voice call is admitted. Thus, no more voice calls would be admitted. Eventually, existing voice calls would be completed, resulting in a total call load as represented by point D. Thus, it may be seen that the total voice call power will asymptotically approach the desired voice call power when averaged over a sufficient length of time.

Figure 4:
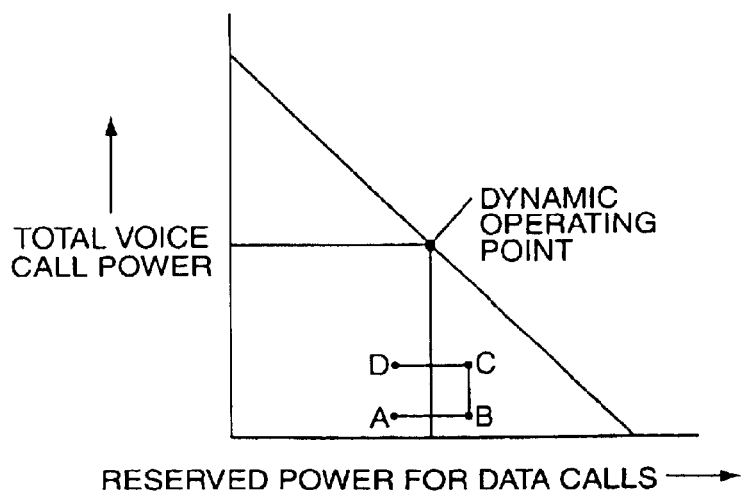
FIG. 4 illustrates the relationship between the voice call power and the reserved data call power for a data call admission policy with a dynamic operating point according to one embodiment of the invention.

Note that an estimate of the current load for data calls will correspond only to those data calls that are presently transmitting bursts of data. There may be other data calls, however, that still have channel resources allotted to them that are not presently active. These admitted data calls may become active and begin transmitting bursts of data within a radio channel. Thus, a data call admission policy should account for all the admitted data calls whether or not they are presently transmitting bursts in the radio channel. In one embodiment, the present invention accounts for these potentially active data calls by basing the admission of a data call request upon a "reserved" power that is a function of the presently admitted data calls and the data call seeking admission. FIG. 4 illustrates the relationship between the voice call power and the reserved data call power for a data call admission policy with a dynamic operating point. The dynamic operating point defines a desired level or target level for the reserved data call power and the total voice call power. A power maximum equals the sum of the desired reserve data power and the desired total voice power levels. Suppose a data call admission request is received when the total call load based upon the current reserved data call power and the current voice call power corresponds to point A. Upon admission of the data call, the necessary reserved power for the data calls corresponds to point B. Although the necessary reserved power exceeds the desired level defined by the dynamic operating point, the data call will be admitted if sufficient channel resources are available to admit at least one voice call. Suppose that, after admission of the data call, the current voice call power increases, resulting in a total load as shown by point C. At such a point, there may no longer be sufficient reserve available to admit a voice call. Thus, no further data calls would be admitted. Eventually, existing data calls would be completed, resulting in a total load as shown by point D. As a result of this dynamic data call admission policy, the reserved power for data calls will asymptotically approach the desired level if averaged over a sufficient period of time.

Note that the reserved power may or may not be sufficient to accommodate all the admitted data calls should all these calls suddenly begin transmitting bursts in the radio channel. This raises a separate issue: how to provide channel resources to an already admitted data call if the reserved power is insufficient. An embodiment of the invention provides a scheduler for scheduling access to channel resources for already admitted data calls that are transitioning from a dormant to an active state.

Figure 5:
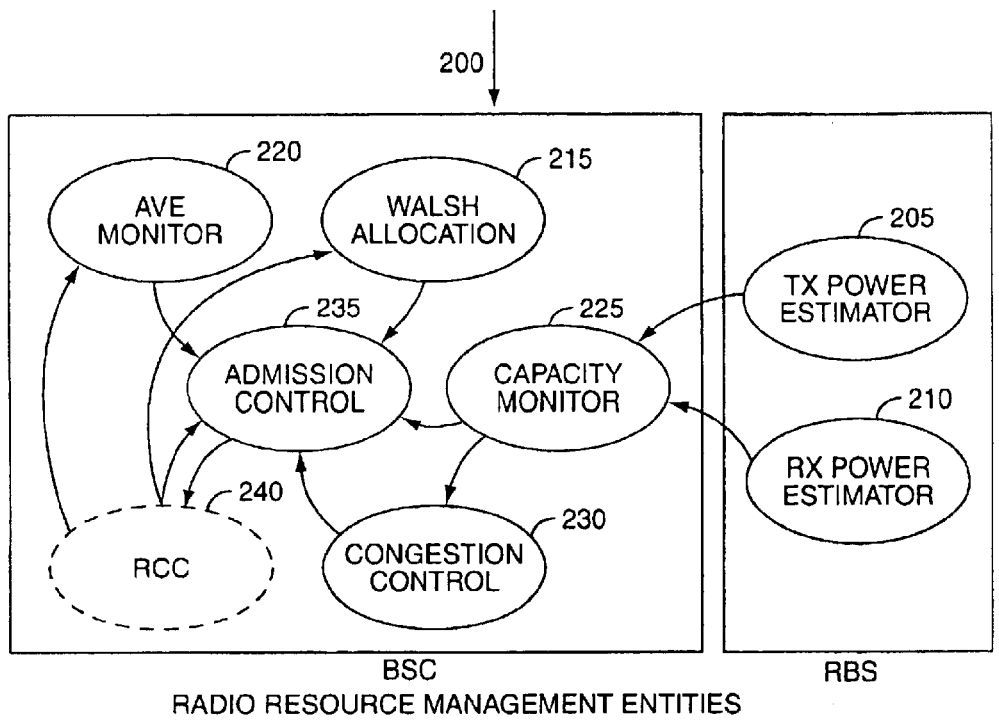
FIG. 5 illustrates the relationship between functional entities of a Radio Resource Manager according to one embodiment of the invention.

Further details of embodiments of the invention are disclosed by the following discussion. Call admission control in a CDMA network such as illustrated in FIG. 1 depends upon the availability of a number of radio resources. A Radio Resource Manager (RRM) is a collection of functional entities that are responsible for estimating load and residual availability of the radio resources, and perform resource control, that is, process requests for such resources. The present invention provides a dynamic call admission policy that may use the functional entities of the RRM. This dynamic call admission policy will be described with respect to a cdma2000 network, however, it will be appreciated that the dynamic call admission policy may be implemented in any CDMA network that permits both voice and data calls. FIG. 5 illustrates a Radio Resource Manager (RRM) 200 with the following functional entities: A Transmit Power Estimator 205 and a Receive Power Estimator 210 are located within the Radio Base Station (RBS). Within the Base Station Controller (BSC) are a Walsh code allocation 215, a CDMA Channel Air-Interface Voice Equivalent (AVE) monitor 220, a Capacity Monitor 225, a Congestion Control 230, a Call Admission Control 235 and a Radio Channel Control (RCC) 240. Using these functional entities, the RRM 200 will control Walsh functions, frame offsets, forward CDMA channel capacity, reverse CDMA channel capacity, and channel elements. Note that channel elements are, strictly speaking, hardware resources, but are managed by the RRM 200 due to the coupling between Walsh function selection and channel element selection. Such coupling exists because of constraints in the CSM5000.

Load monitors within the RRM 200 include the Transmit Power Estimator 205, Receive Power Estimator 210 and the AVE monitor 220. With information obtained by the load monitors, the BSC keeps updated estimates of the residual availability of its radio resources, as will be described further herein. For those estimators that are distributed at the RBS, load measurements are sent to the BSC either periodically, and/or on-demand, and/or event driven. Further examination of these load monitor are as follows, beginning with the Transmit Power Estimator 205. Because this denotes transmission from the RBS to a mobile user, it may also be denoted the Forward CDMA Channel Transmit Power Estimator 205.

The Forward CDMA Channel Load Estimator 205 is located at the RBS. The estimator receives periodically the instantaneous transmit power of all traffic channels active on a CDMA channel. The default update period is 20 msec. The total CDMA channel instantaneous power, $P_{TX}$, is obtained by summing up the individual contributions of a CSM5000 ASIC that are daisy-chained to the CDMA channels. An Application Program Interface (API) in the CSM5000 ASIC retrieves total transmit power measurements filtered over a power control group (1.25 msec) for each of the six CDMA channels it may be connected to. The individual contributions are then filtered by a load estimation function to compute the estimated load, $\hat{P}_{TX}$. The filter may be a single pole IIR filter with different time attack and decay time constants, as described in the following equations:

$$\hat{P}_{TX}(n) = (1-\alpha) \cdot \hat{P}_{TX}(n-1) + \alpha \cdot P_{TX}(n),$$

where $$\alpha = \begin{cases} \alpha_{UP} & \text{if } P_{TX}(n) \geq \hat{P}_{TX}(n-1) \\ \alpha_{DOWN} & \text{otherwise} \end{cases}.$$

Typically, $\alpha_{UP}$, is larger than $\alpha_{DOWN}$. Such conservatism is motivated by the fact that it is desirable to react faster to increasing load than it is to decreasing load.

The operation of the Receive Power Estimator 210 is analogous. Because this functional entity is estimating power sent by the mobile units, it may also be denoted the Reverse CDMA Channel Power Estimator 210. The reverse CDMA channel power estimator 210 is located at the RBS. The estimator receives periodically the instantaneous digitized received signal strength indication (RSSI) value. The default update period is 20 msec. The RSSI samples are filtered using a single pole IIR filter with different time attack and delay values, as described in the following equations:

$$\hat{P}_{RX}(n) = (1-\alpha) \cdot \hat{P}_{RX}(n-1) + \alpha \cdot P_{RX}(n),$$

where $$\alpha = \begin{cases} \alpha_{UP} & \text{if } P_{RX}(n) \geq \hat{P}_{RX}(n-1) \\ \alpha_{DOWN} & \text{otherwise} \end{cases}.$$

Typically, $\alpha_{UP}$, is larger than $\alpha_{DOWN}$. Such conservatism is motivated by the fact that it is desirable to react faster to increasing load than it is to decreasing load.

Having obtained an estimate of the current transmitted power in either the forward or reverse radio channel, a call admission policy must estimate the current power levels for the data and voice calls. One way to do so is to establish a power reference that individual voice and data calls are compared. One such suitable reference is the RC3 channel in the FCH operating at a 1% frame error rate (FER). By convention, if a voice call were operating with these characteristics, it is denoted as a full voice equivalent. Thus, if there are a number $N_V$ of voice callers and they are all operating RC3, the total voice AVE would be simply equal to $N_V$.

A load monitor to calculate the voice AVE and data AVE is the CDMA Channel AVE Monitor 220 that is located at the BSC. There is one instance of such monitor per CDMA channel. The AVE is the total carried traffic expressed in terms of equivalent voice users. Each dedicated traffic channel is expected to carry a load expressed in AVE, which is a function of the channel configuration (spreading factor, channel data rate) and service option in use according to a mapping stored in the AVE table of resource control. An example mapping is given by Table 1. Note that an FCH voice activity factor, which may be assumed equal to 0.48, is accounted for in the computation of the AVE.

Consider, however, the calculation of the AVE for a data user. Unlike a voice user, a given data user is bursty so that estimating the contributions from data callers to the total current power level estimation should be based only upon data callers transmitting bursts at the time of the total power estimation. The number of these active data users, $N_B$, must be distinguished from the total number of admitted data users, $N_D$, who are currently not transmitting bursts.

The forward and reverse link AVE load of a CDMA channel is the sum of the AVE of all active forward and reverse traffic channels, respectively. The contributions to the total AVE of voice users and data users with an allocated SCH are tracked separately. That is, $$AVE_{TOT} = AVE_{VOICE} + AVE_{DATA} = \sum_{i=1}^{N_V} AVE_i + \sum_{i=1}^{N_B} AVE_i.$$

| SCH Rate [Kbps] | Code type | RC | Frame Length [msec] | SCH target FER % | AVE relative to RC3 FCH @ 1% FER |
|---|---|---|---|---|---|
| 9.6 | Conv. | 3 | 20 | 5 | 0.85 |
| 19.2 | Conv. | 3 | 20 | 5 | 1.7 |
| 38.4 | Conv. | 3 | 20 | 5 | 3.4 |
| 76.8 | Conv. | 3 | 20 | 5 | 6.8 |
| 153.6 | Conv. | 3 | 20 | 5 | 13.6 |

When a traffic channel is in soft or softer handoff, such connection contributes to the total AVE of each cell in the active set. Then, to account for connections in soft/softer handoff, the equation for the total AVE is rewritten as $$AVE_{TOT} = AVE_{VOICE} + AVE_{DATA} = \sum_{i=1}^{N_V} f(K_i) \cdot AVE_i + \sum_{i=1}^{N_B} f(K_i) \cdot AVE_i,$$

where $K_i$ represents the active set size of the $i^{th}$ connection, and $f(K)$ is a monotonically decreasing function of $K$. An aggressive approach would be to set $f(K)=1/K$, while a conservative approach would be to set $f(K)=1 \; \forall \; K$.

The RCC 240 informs the AVE monitor 220 whenever a voice call, or handoff, is either admitted or released, and whenever a data burst is scheduled for transmission. The AVE monitor 220 updates the current load estimate and maintains a running average of the voice and data AVE. Because voice is not bursty, the average AVE for voice, $\overline{AVE}_{VOICE}$, may be easily calculated. However, the filtered AVE for data, $\overline{AVE}_{DATA}$, may be computed as $$\overline{AVE}(n) = \frac{1}{T} \cdot \int_{n \cdot T_S - T}^{n \cdot T_S} \sum_{i=1}^{N_B(t)} f(K_i) \cdot AVE_i \cdot dt,$$

where T is filter averaging window and $T_S$ is the update rate. Other types of filters may be used so long as they account for the contributions from the active data users.

The admission control entity 235 must have an estimate of the total forward CDMA channel load caused by active data users that are transmitting a data burst over the SCH channel. This may be accomplished using the current AVE levels for the data and voice calls and the current estimated transmitted power in the following fashion. Let $P_{VOICE}$ and $P_{DATA}$ be the aggregate instantaneous transmit power of voice and data users, respectively. Then, from the AVE calculations the following approximation may be made:

$$P_{TX} = P_{VOICE} + P_{DATA} \cong (AVE_{VOICE} + AVE_{DATA}) \cdot P_{REF},$$

where $P_{REF}$ is the transmit power of a voice user (allocated a RC3 FCH @ 1% FER), which is taken as a reference by convention. Using now the filtered estimates of the AVE and total transmit power, it follows that $$\hat{P}_{VOICE} \cong \frac{\hat{P}_{TX}}{1 + \frac{\overline{AVE}_{DATA}}{\overline{AVE}_{VOICE}}}; \text{ and}$$

$$\hat{P}_{DATA} \cong \frac{\hat{P}_{TX}}{1 + \frac{\overline{AVE}_{VOICE}}{\overline{AVE}_{DATA}}} = \hat{P}_{TX} - \hat{P}_{VOICE}.$$

Note that the transmit power estimation filter time constant used by the Forward CDMA Channel Load Estimator 205 must be set equal to one half of the AVE filter averaging window used by the AVE monitor 220 for the filters to be equivalent in terms of variance reduction.

Based upon these calculated powers for voice and data callers, call admission control of the present invention allows for dynamic allocation of resources between the voice and data users. Although an operating point is set in order to determine the percentile of resources that are to be used by voice and data applications, the resources are allocated in a dynamic manner. This means that in absence of data users, for example, the resources can be utilized by voice users and vice versa. The call admission algorithm of the present invention is designed in such a way that in the presence of a predicted mix of data and voice users, the system will operate at the target operating point. The operating point is settable by the operator. These percentiles will be translated to the corresponding values for the transmit power and two subsets of the Walsh code space for voice and data users. Voice call admission will be discussed first.

In the following algorithm for voice call admission, $\hat{P}_{VOICE}$ is total current transmit power per CDMA channel for voice users, $N_V$ represents the number of active voice users at the time of admission. In the following, the expected transmit power of the incoming voice user is equal to the average transmit power per voice user weighted by the new user AVE, $AVE_{NEW\_USER}$. That is, $AVE_{NEW\_USER} \cdot \hat{P}_{VOICE} | \overline{AVE}_{VOICE}$.

Such an estimate of the expected transmit power of the incoming voice user is more reliable than one based on the initial transmit power as estimated by the forward link open loop power control function. A good estimate predicts the long term expected power consumption, which, in the case of mobile users, has little correlation with the initial transmit power.

The algorithm first checks whether by granting access to the new voice user the total power for voice users is going to be larger than the desired operating point or not. If it is going to be larger, it admits the voice call if and only if there are going to be enough residual resources to allow admission of one or more data calls. Note that the level of necessary residual resources sufficient to allow admission of one or more data calls is a parameter configurable by the user. In what follows, the residual capacity set aside is indicated with $P_{DATA\_RESERVED}$, and the maximum allowable total traffic channel power is indicated with $P_{MAX}$. Then, the algorithm can be described by the pseudo-code below.

IF $$\hat{P}_{VOICE} \cdot \left(1 + \frac{AVE_{NEW\_USER}}{\overline{AVE}_{VOICE}}\right) \leq P_{VOICE\_TARGET}$$

AND $$\hat{P}_{VOICE} \cdot \left(1 + \frac{AVE_{NEW\_USER}}{\overline{AVE}_{VOICE}}\right) + \hat{P}_{DATA} \leq P_{MAX}$$

THEN

GRANT ADMISSION

ELSEIF $$\hat{P}_{VOICE} \cdot \left(1 + \frac{AVE_{NEW\_USER}}{\overline{AVE}_{VOICE}}\right) > P_{VOICE\_TARGET}$$

AND $$P_{MAX} - \hat{P}_{VOICE} \cdot \left(1 + \frac{AVE_{NEW\_USER}}{\overline{AVE}_{VOICE}}\right) - \hat{P}_{DATA} \leq P_{DATA\_RESERVED}$$

AND $$\hat{P}_{VOICE} \cdot \left(1 + \frac{AVE_{NEW\_USER}}{\overline{AVE}_{VOICE}}\right) + \hat{P}_{DATA} \leq P_{MAX}$$

THEN

GRANT ADMISSION

ELSE

DENY ADMISSION

ENDIF

Figure 6:
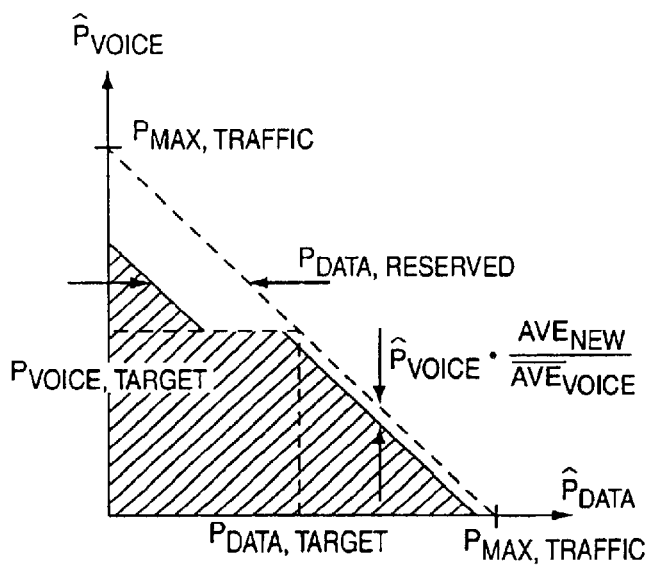
FIG. 6 illustrates the operating region within which voice call admission is granted according to one embodiment of the invention.

The resulting operating region within which a voice call admission request is granted is illustrated by the shaded area in FIG. 6.

Turning now to data call admission policy, the algorithm verifies availability of resources based on the residual 'reserved' power of data calls rather than the actual power consumed by data calls. This reserved power is a function of the admitted data calls, regardless of whether these admitted data calls are presently transmitting bursts in the radio channel. In one embodiment, the reserved power could simply equal that required by the total AVE of all the admitted data calls. Such a reserved power assures that if all the admitted data calls suddenly begin transmitting bursts, there will be sufficient channel resources to accommodate all the data calls. Note that such a scenario is not typical because of the bursty nature of data calls. Typically, not all the admitted data calls will transmit a burst in the radio channel at any given time. Thus, a more aggressive approach is to reserve less power than that required by the total AVE of the admitted data calls. In one embodiment of such an aggressive approach, the reserved power is a step function of the total AVE of the data calls that have been admitted in the cell, $N_D$, and have been allocated a dedicated channel (i.e., non-dormant data calls) but that may or may not be transmitting a data burst on the SCH. That is, $N_D \geq N_B$. The reserved power as a function of the total data AVE is tabulated in Table 1. Note that the reserved power is smaller than the total AVE, the assumption being that multiple users share the same SCH and therefore the same amount of power and resources.

In embodiments of the invention that use a reserved power less than the total AVE of the admitted data calls, it is conceivable that an admitted data caller will seek to transmit a burst but there will be insufficient reserved power and channel resources available to accommodate the burst. A number of scheduler designs will be discussed herein for such an embodiment of the invention.

The mapping between total data AVE and reserved power depends on the scheduler design, and on the tolerable outage probability. If, however, the use of a scheduler is to be avoided, the reserved power would be equal to the total AVE of the data users that have been granted admission, regardless of the fact that they may or may not be transmitting a data burst on the SCH.

TABLE 1

Reserved power for data calls

| Total AVE of admitted data calls, $\sum_{i}^{N_o} AVE_i$ | Reserved data AVE power, $f\left(\sum_{i}^{N_o} AVE_i\right)$ |
|---|---|
| ≤0.4 | 0.4 |
| (0.4, 1.6] | 0.8 |
| (1.6, 3.2] | 1.6 |
| (3.2, 6.5] | 3.2 |
| >6.5 | 6.5 |

The data call admission algorithm first checks whether by granting access to the new data user the total 'reserved' power for data users is going to be larger than the desired operating point or not. If it is going to be larger, it admits the data call if and only if there are going to be enough residual resources to allow admission of one or more voice calls. Note that the level of necessary residual resources sufficient to allow admission of one or more voice calls is a parameter configurable by the user. In what follows, the residual capacity set aside is indicated with $P_{VOICERESERVED}$, and the maximum allowable total traffic channel power is indicated with $P_{MAX}$. Then, the algorithm can be described by the pseudo-code below.

IF $$f\left(\sum_{i}^{N_D} AVE_i + AVE_{NEW}\right) \cdot \frac{\hat{P}_{VOICE}}{\overline{AVE}_{VOICE}} \leq P_{DATA\_TARGET}$$

AND $$\hat{P}_{VOICE} \cdot \left[1 + f\left(\sum_{i}^{N_D} AVE_i + AVE_{NEW}\right) \cdot \frac{1}{\overline{AVE}_{VOICE}}\right] \leq P_{MAX}$$

THEN

GRANT ADMISSION

ELSEIF $$f\left(\sum_{i}^{N_D} AVE_i + AVE_{NEW}\right) \cdot \frac{\hat{P}_{VOICE}}{\overline{AVE}_{VOICE}} > P_{DATA\_TARGET}$$

AND $$P_{MAX} - \hat{P}_{VOICE} \cdot \left[f\left(\sum_{i}^{N_D} AVE_i + AVE_{NEW}\right) \cdot \frac{1}{\overline{AVE}_{VOICE}}\right] > P_{VOICE\_RESERVED}$$

AND $$\hat{P}_{VOICE} \cdot \left[1 + f\left(\sum_{i}^{N_D} AVE_i + AVE_{NEW}\right) \cdot \frac{1}{\overline{AVE}_{VOICE}}\right] \leq P_{MAX}$$

THEN

GRANT ADMISSION

```
   ELSE
       DENY ADMISSION
   END IF
```

Note that admission requests corresponding to dormant to active transitions are treated like a new call.

Turning now to discussion of a scheduler, in one embodiment, after a data user is admitted, the burst requests from this user is processed and an SCH is assigned to this user if enough resources are available in the reserved SCH resource pool. The burst is denied access to the supplemental channel if there are not enough resources. The user will back off for a random period of time and try again for burst transmission. In another scheduler embodiment, the bursts from different data users are queued and scheduled and transmitted according to their position in the queue as soon as the resources become available. The position of the burst requests in the queue can be a function of number of things such their time of arrival, the higher priority of the users in SHO, QoS level and so forth. The buffer levels can be used to determine whether an SCH should be assigned on top of the FCH. At any given time, the scheduler will assign an SCH to the user with the highest priority as soon as the resources are available. For each user, the maximum data rate is negotiated at the time of admission, and a power cap or maximum is considered for each data rate. This could be accomplished in a look-up table. The required transmit power for the data traffic within the SCH at a certain data rate could be either calculated using the FCH transmit power or extracted from the up-link SNR. The scheduler may use this power to calculate the data rate at which a burst can be transmitted. A table look-up can be used by the RRM to calculate the overall SCH transmit power for all the active users. A table in the RBS can contain the corresponding maximum power value for each data connection. The scheduler may then use the minimum of the available power and the corresponding maximum power value to determine the data rate at which the burst can be transmitted. The depth of the buffer is used as one of the factors to determine the requested data rate for each user.

For the first discussed scheduler embodiment, the corresponding AVE for data users would be assigned more conservatively to account for the loss of efficiency due to the lack of the scheduler. Note that the scheduler of the present invention, which results in sharing or scheduling of the reserved power in the SCH channel, avoids the complication of a TDMA type if mode of operation and works very naturally with the TCP/IP that resides on top of the MAC layer in a cdma 2000 system.

Although specific examples of the present invention have been shown by way of example in the drawings and are herein described in detail, many modifications may be made to these examples and still be within the scope of the present invention. For example, although the call admission policy has been described with respect to the call loads in the forward channel, call loads in the reverse channel could have been considered as well. Furthermore, the scheduler of the present invention is easily modified to work in call admission policies having a fixed operating point. Thus, the invention is not to be limited to the particular forms or methods disclosed, but to the contrary, the invention is to broadly cover all modifications, equivalents, and alternatives emcompassed by the scope of the appended claims.

We claim:

1. A dynamic voice call admission method for CDMA systems, comprising:

for a channel selected from the group of forward and reverse radio channels:

calculating a current channel power level for data calls and a current channel power level for voice calls;

receiving a request to admit a voice call, wherein a channel power level for voice calls upon admission will exceed a desired total voice power level if the call admission request is granted; and admitting the voice call if the sum of the channel power level for voice calls upon admission and the current channel power level for data calls is less than a power maximum and if, upon admission, a sufficient reserved power is available to admit at least one additional data call.

2. The method of claim 1, further comprising the steps of:

providing a power reference based upon a voice call with certain operating characteristics, wherein calls having identical operating characteristics are denoted a voice equivalent;

estimating a total current transmitting power of the radio channel; and estimating, for the radio channel, the total voice equivalent for the data calls and the voice calls, wherein the calculating of the current channel power levels for the data calls and the voice calls and the channel power level for voice calls upon admission are based upon the total current transmitting power of the radio channel and the total voice equivalents.

3. The method of claim 2, wherein the radio channel is the forward radio channel.

4. The method of claim 3, wherein the calculation of the total voice equivalents for the data calls is based upon only data calls that are currently transmitting bursts in the forward radio channel.

5. A dynamic voice call admission method for CDMA systems, comprising:

for a channel selected from the group of forward and reverse radio channels:

calculating a current channel power level for voice calls;

receiving a request to admit a data call, wherein a reserved channel power level for data calls will exceed a desired reserved channel power if the call admission request is granted; and admitting the data call if the sum of the reserved channel power level for the data calls upon admission and the current channel power level for voice calls is less than a power maximum and if, upon admission, a sufficient power is available to admit at least one additional voice call.

6. The method of claim 5, further comprising the steps of:

providing a power reference based upon a voice call with certain operating characteristics, wherein calls having identical operating characteristics are denoted a voice equivalent;

estimating a total current transmitting power of the radio channel; and estimating, for the radio channel, the total voice equivalent for the data calls upon admission and the voice calls, wherein the calculating of the current channel power levels for the voice calls and the reserved channel power level for the data calls upon admission are based upon the total current transmitting power of the radio channel and the total voice equivalents.

7. The method of claim 6, wherein a voice equivalent of the reserved channel power for the data call upon admission is less than the total voice equivalent for the data calls upon admission.

8. The method of claim 7, wherein the channel is the forward radio channel.

9. A call admission monitor in a wireless communication network, comprising:
- a voice power estimator configured to estimate a total voice power level for all voice communications being serviced on a communication channel; and
- a data power estimator configured to estimate a total data power level for all data communications being serviced on the communication channel;
- the call admission monitor configured to admit additional voice or data communications based on a configurable dynamic operating point for a maximum channel power.

10. The call admission monitor of claim 9, wherein the maximum channel power is a maximum power level for the sum of the total voice power level and the total data power level for the communication channel.

11. The call admission monitor of claim 9, wherein the total data power level is converted to an equivalent total voice power level, and wherein the maximum channel power is a maximum power level for the sum of the total voice power level and the equivalent total voice power level for the communication channel.

12. The call admission monitor of claim 11, wherein the equivalent total voice power level is based on only those data communications that are currently transmitting.

13. The call admission monitor of claim 9, configured to admit an additional voice communication provided the maximum channel power is not exceeded and provided a sufficient reserved power is available to admit at least one additional data communication.

14. The call admission monitor of claim 9, configured to admit an additional data communication provided the maximum channel power is not exceeded and provided a sufficient reserve power is available to admit at least one additional voice communication.

15. The call admission monitor of claim 9, further comprising a scheduler configured to schedule channel resources for burst requests originating from data communications that are transitioning from dormant to active.

16. The call admission monitor of claim 15, wherein the scheduler is further configured to schedule the data rate for data communications.

17. The call admission monitor of claim 15, wherein the scheduler is further configured to assign channel resources to a data communication if sufficient channel resources are available, and to periodically check the channel resources until there are sufficient channel resources for the data communication.

18. The call admission monitor of claim 15, wherein the scheduler is further configured to assign channel resources to a data communication if sufficient channel resources are available, and wherein the scheduler is further configured to queue the data communications when there are insufficient channel resources and to assign the resources, as they become available, to the queued data communications.

19. A wireless communications system, comprising:
- a plurality of mobile devices configured for data and voice communication; and
- at least one base station that includes a call admission monitor, the call admission monitor comprising
- a voice power estimator configured to estimate a total voice power level for all voice communications being serviced on a communications channel; and
- a data power estimator configured to estimate a total data power level for all data communications being serviced on the communications channel;
- the call admission monitor configured to admit additional voice or data communications based on a configurable dynamic operating point for a maximum channel power.

20. The wireless communication system of claim 19, the call admission monitor configured to admit an additional voice communication provided the maximum channel power is not exceeded and provided a sufficient reserved power is available to admit at least one additional data communication.

21. The wireless communication system of claim 19, the call admission monitor configured to admit an additional data communication provided the maximum channel power is not exceeded and provided a sufficient reserve power is available to admit at least one additional voice communication.

22. The wireless communication system of claim 19, wherein the call admission monitor further comprises a scheduler configured to schedule channel resources for burst requests originating from data communications that are transitioning from dormant to active.

* * * * *

UNITED STATES PATENT AND TRADEMARK OFFICE
CERTIFICATE OF CORRECTION

PATENT NO. : 6,975,609 B1
DATED : December 13, 2005
INVENTOR(S) : Khaleghi et al.

It is certified that error appears in the above-identified patent and that said Letters Patent is hereby corrected as shown below:

Column 9,
Line 10, replace the equation with:

$$P_{MAX} - \hat{P}_{VOICE} \cdot \left(1 + \frac{AVE_{NEW\_USER}}{AVE_{VOICE}}\right) - \hat{P}_{DATA} \geq P_{DATA\_RESERVED}$$

Signed and Sealed this

Eleventh Day of April, 2006

JON W. DUDAS
*Director of the United States Patent and Trademark Office*